United States Patent
Hathorn et al.

(10) Patent No.: US 7,480,840 B2
(45) Date of Patent: Jan. 20, 2009

(54) APPARATUS, SYSTEM, AND METHOD FOR FACILITATING PORT TESTING OF A MULTI-PORT HOST ADAPTER

(75) Inventors: Roger Gregory Hathorn, Tucson, AZ (US); Brent Ryan Modesitt, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 927 days.

(21) Appl. No.: 10/963,475

(22) Filed: Oct. 12, 2004

(65) Prior Publication Data

US 2006/0085699 A1  Apr. 20, 2006

(51) Int. Cl.
- G01R 31/28 (2006.01)
- G01R 31/08 (2006.01)
- G06F 7/02 (2006.01)
- H04B 3/46 (2006.01)

(52) U.S. Cl. ............... 714/724; 714/712; 714/716; 714/821; 370/242; 370/248; 370/249; 375/224

(58) Field of Classification Search ............ 714/712, 714/716, 724, 821; 370/242, 248, 249; 375/224
See application file for complete search history.

(56) References Cited

U.S. PATENT DOCUMENTS

| | | | |
|---|---|---|---|
| 4,086,636 A | 4/1978 | Cimic et al. ............ | 360/75 |
| 4,939,735 A | 7/1990 | Fredericks et al. ...... | 371/47.1 |
| 5,023,873 A | 6/1991 | Stevenson et al. ...... | 371/8.2 |
| 5,263,028 A | 11/1993 | Borgnis et al. ......... | 370/105 |
| 5,905,744 A * | 5/1999 | Reise et al. ............ | 714/821 |
| 2002/0104039 A1 | 8/2002 | DeRolf et al. .......... | 714/30 |

FOREIGN PATENT DOCUMENTS

JP  05-118955  5/1993

OTHER PUBLICATIONS

FOLDOC, "Multithreading", http://wombat.doc.ic.ac.uk/foldoc/foldoc.cgi?multithreading.
Gustavo Castets, et al, "IBM Total Storage Enterprise Storage Server Model 800", ibm.com/redbooks.

* cited by examiner

Primary Examiner—John P Trimmings
Assistant Examiner—John J Tabone, Jr.
(74) Attorney, Agent, or Firm—Kunzler & McKenzie

(57) ABSTRACT

An apparatus, system, and method are provided for facilitating port testing of a multi-port host adapter. The present invention includes a scheduler that schedules execution of a plurality of threads to test a first port and a plurality of threads to test a second port of a multi-port adapter. The port test routine is divided into threads such that execution time and switching overhead is minimized. A multithreading module provides multithreaded execution of the plurality of threads such that the port test of the first port and the port test of the second port are performed in parallel. The apparatus further includes a communication module that takes the first port and the second port off-line. A third port remains on-line for Input/Output (I/O) communications that are multithreaded with the plurality of threads involving the first port and the second port.

30 Claims, 8 Drawing Sheets

APPARATUS, SYSTEM, AND METHOD FOR FACILITATING PORT TESTING OF A MULTI-PORT HOST ADAPTER

BACKGROUND OF THE INVENTION

1. Field of the Invention

The invention relates to networked computer systems. Specifically, the invention relates to apparatus, systems, and methods for facilitating port testing of a multi-port host adapter in a computer system.

2. Description of the Related Art

Computer and information technology continues to progress and grow in its capabilities and complexity. In particular, networking hardware and software has evolved from dedicated single port communication to multi-port communications between two networked devices. The additional ports provide higher throughput, more reliability, and failover protection in the event one of the ports fails or causes communication errors. Similarly, two networked computer systems may include multiple network interface cards, referred to herein as network host adapters to provide added reliability, throughput, and service in providing network communications.

FIG. 1 illustrates a system 100 suitable for implementing the present invention to facilitate port testing of host adapters and particular ports of multi-port adapters. The system 100 includes a host 102 connected to a storage subsystem 104 by a network 106 such as a Storage Area Network (SAN) 106. The host 102 communicates control commands and data, in the form of Input/Ouput (I/O) communications, to the storage subsystem 104. Hosts 102 are well known in the art and comprise any computer system configured to communicate control commands or data to the storage subsystem 104.

Similarly, the storage subsystem 104 is well known and comprises any computer system capable of responding to control commands and I/O communications from hosts 102. One example of a storage subsystem 104 suitable for use with the present invention is an IBM Enterprise Storage Server® available from International Business Machines Corporation (IBM) of Armonk, N.Y. The SAN 106 represents a network dedicated to communications relating to transfer and control of data between hosts 102 and storage subsystems 104. However, the present invention may be implemented with any network 106, a SAN being but one example.

Communications between the host 102 and storage subsystem 104 may be conducted using various common protocols and the hardware and software that support them. For example, the storage subsystem 104 may include host adapters 108 configured to support the Fibre Channel optical communication protocol. Of course, various other host adapters 108 may be used to support other protocols including, but not limited to, Internet Small Computer Interface (iSCSI), Fibre Channel over IP (FCIP), Enterprise Systems Connection (ES-CON), InfiniBand, and Ethernet.

Generally, to provide enhanced reliability and enhanced performance throughout, the storage subsystem 104 includes a plurality of host adapters 108, one or more processors 110, an electronic memory device 112, and one or more electronic storage devices 114. The processors 110 process control commands and I/O communications. The electronic memory device 112 provides command and control storage for the processors. The electronic storage devices 114 provide persistent storage of data and may comprise storage arrays for increased data storage capacity and reliability.

Generally, it is desirable that the storage subsystem 104 provide reliable operations on a 24/7 schedule. Consequently, the natural errors and failures associated with the hardware and software of the storage subsystem 104 should provide a minimal disruption in normal operations. Unfortunately, repair, maintenance, and troubleshooting of errors in conventional storage subsystems 104 can introduce significant delays and severely impact performance of the subsystem 104.

In particular, significant time and productivity of the storage subsystem 104 can be lost in troubleshooting errors. Generally, troubleshooting includes running one or more test routines against different hardware and software modules to isolate the error. Typically, the storage subsystem 104 remains on-line and operational to service host requests during troubleshooting. Conventionally, each host adapter 108 is taken off-line, tested using the test routine and placed back on-line if the adapter 108 passes the test routine. In this manner, host adapters 108 not being tested can continue to service I/O communications.

Sequentially, applying the test routine to each adapter 108 in turn can take significant time, especially for test routines that require a technician to attach and remove test equipment. One example of such a test routine is a wrap test (also referred to as a loopback test or loop test). A wrap test tests to ensure that a transmitter and a receiver of the adapter is properly sending and receiving data through a particular port. Test data is transmitted out the port and then passed back into the same port by a piece of wrap test equipment, typically cable suitable for the communication hardware.

Conventionally, to perform a wrap test the whole host adapter 108 is taken off-line. This becomes problematic when the host adapter 108 includes multiple ports. Error free ports are needlessly taken off-line. Furthermore, using conventional test routines, the ports are tested one at a time in sequence. Typically, a technician attaches a wrap test cable to a port to be tested, initiates the port wrap test routine, waits for the test routine to complete, records the results, and then connects the wrap test cable to the next port. Any failed ports are identified. Testing of a single port may take as little as two minutes. However, all the ports are off-line until the last port is tested. Performing a wrap test on a single adapter may take as long as ten minutes. This delay can severely impact the performance of the storage subsystem 104.

Furthermore, the wrap test routine is designed for single port adapters. Consequently, the wrap test preserves the current state of the adapter 108, takes the adapter 108 off-line, and then restores the state to put the adapter 108 back on-line. This means that as multiple ports are tested on a single multi-port host adapter 108 the delay to maintain state information is multiplied by the number of ports tested. Serial testing of ports on a multi-port host adapter 108 significantly increases the testing time and down time of the adapter.

In addition, using conventional port test routines, such as a wrap test, the controller or processor that initiates the wrap test waits for the wrap test to complete before reporting the results of the wrap test. This is problematic in a multi-port adapter 108 because time and resources (other non-tested ports) of the adapter 108 are wasted because the controller is tied up testing the one port. Similarly, because the test routine takes the whole adapter off-line, ports not involved in the test can not be used to continue to process I/O communications. The adapter is off-line and the controller or processor of the adapter is busy waiting for the single port test routine to complete.

From the foregoing discussion, it should be apparent that a need exists for an apparatus, system, and method for facilitating port testing of a multi-port host adapter in a computer system. Beneficially, such an apparatus, system, and method would take just the port being tested off-line and allow ports not involved in a port test routine to continue processing I/O communications. In addition, the apparatus, system, and method would execute a port test routine simultaneously on two or more ports of a multi-port adapter. Furthermore, the apparatus, system, and method would configure a multi-port adapter once to perform one or more port test routines and then reconfigure the multi-port once to restore normal I/O communication processing.

SUMMARY OF THE INVENTION

The present invention has been developed in response to the present state of the art, and in particular, in response to the problems and needs in the art that have not yet been met for port testing of a multi-port host adapter in a computer system. Accordingly, the present invention has been developed to provide an apparatus, system, and method for facilitating port testing of a multi-port host adapter in a computer system that overcomes many or all of the above-discussed shortcomings in the art.

An apparatus according to the present invention includes a scheduler, and a multithreading module. The scheduler schedules execution of a plurality of threads to test a first port and a second port of a multi-port adapter. The plurality of threads are defined by dividing the port test routine that represents the test to be applied to the first and second ports. The threads comprise independent executable segments of the port test routine. In certain embodiments, the threads comprise related functionality of the test routine grouped such that runtime and switching overhead for each thread is minimized. In one embodiment, the scheduler orders execution of the plurality of threads such that each thread is executed with each port tested.

The multithreading module is configured to provide multithreaded execution of the plurality of threads such that the port test of the first port and the port test of the second port are performed in parallel. In this manner, multiple ports of a single adapter are tested concurrently. In one embodiment, the multithreading module stores a port context for each of the first port and the second port and reads the port context in response to resuming execution of the thread associated with each port. The multithreading module may execute each thread for a predetermined time interval before switching to another thread.

In certain embodiments, the apparatus includes a communication module, a configuration module, and a port test module. The communication module in certain embodiments is configured to take the first port and the second port off-line while a third port of the multi-port adapter remains on-line to provide Input/Output (I/O) communications. In addition, the multithreading module may be further configured to multithread I/O communications and the plurality of threads involving the first port and the second port, the I/O communications utilizing the third port.

The configuration module configures the multi-port adapter for a port test of the first port and the second port in response to a single multi-port test request. In certain embodiments, the multi-port adapter remains configured for a port test until all threads testing ports have completed execution. Similarly, the configuration module reconfigures the multi-port adapter to resume regular I/O communications in response to completion of the port test routine on the first port and the second port.

The port test module acknowledges the multi-port test request from a control processor. The port test module also ends a communication session with the control processor such that the control processor can resume normal operations. In certain embodiments, port test module sends status report messages to the control processor in response to periodic status inquiries from the control processor.

In one embodiment of the apparatus, an initiation module is configured to send a multi-port test request to a controller of a multi-port host adapter. The multi-port test request identifies one or more ports of the multi-port adapter for a port test routine and the controller comprises a scheduler and a multithreading module similar to those described above. The apparatus further includes a confirmation module configured to receive an acknowledgment from a port test module of the controller. The apparatus may also include a polling module configured to end a communication session with the controller, to send periodic status inquiries, and to process status report messages from the controller.

A method of the present invention is also presented for facilitating port testing of a multi-port host adapter in a computer system. In one embodiment, the method includes dividing a port test routine into a plurality of threads, each thread comprising a segment of the routine. The threads are independent of each other and designed to minimize the execution time and switching time of the thread. Next, execution of the plurality of threads is scheduled to test a first port and a second port of a multi-port adapter, the test represented by the port test routine. Finally, execution of the plurality of threads is multithreaded such that the port test of the first port and the port test of the second port are performed in parallel.

In certain embodiments, the method may include taking the first port and the second port off-line while a third port of the multi-port adapter remains on-line to provide I/O communications and multithreading of I/O communications and the plurality of threads involving the first port and the second port, the I/O communications utilizing the third port. Furthermore, the method may configure the multi-port adapter for a port test of the first port and the second port in response to a single multi-port test request and reconfigure the multi-port adapter to resume regular I/O communications in response to completion of the port test routine on the first port and the second port.

The present invention also includes embodiments arranged as a system, computer readable code, and an apparatus that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of select embodiments of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
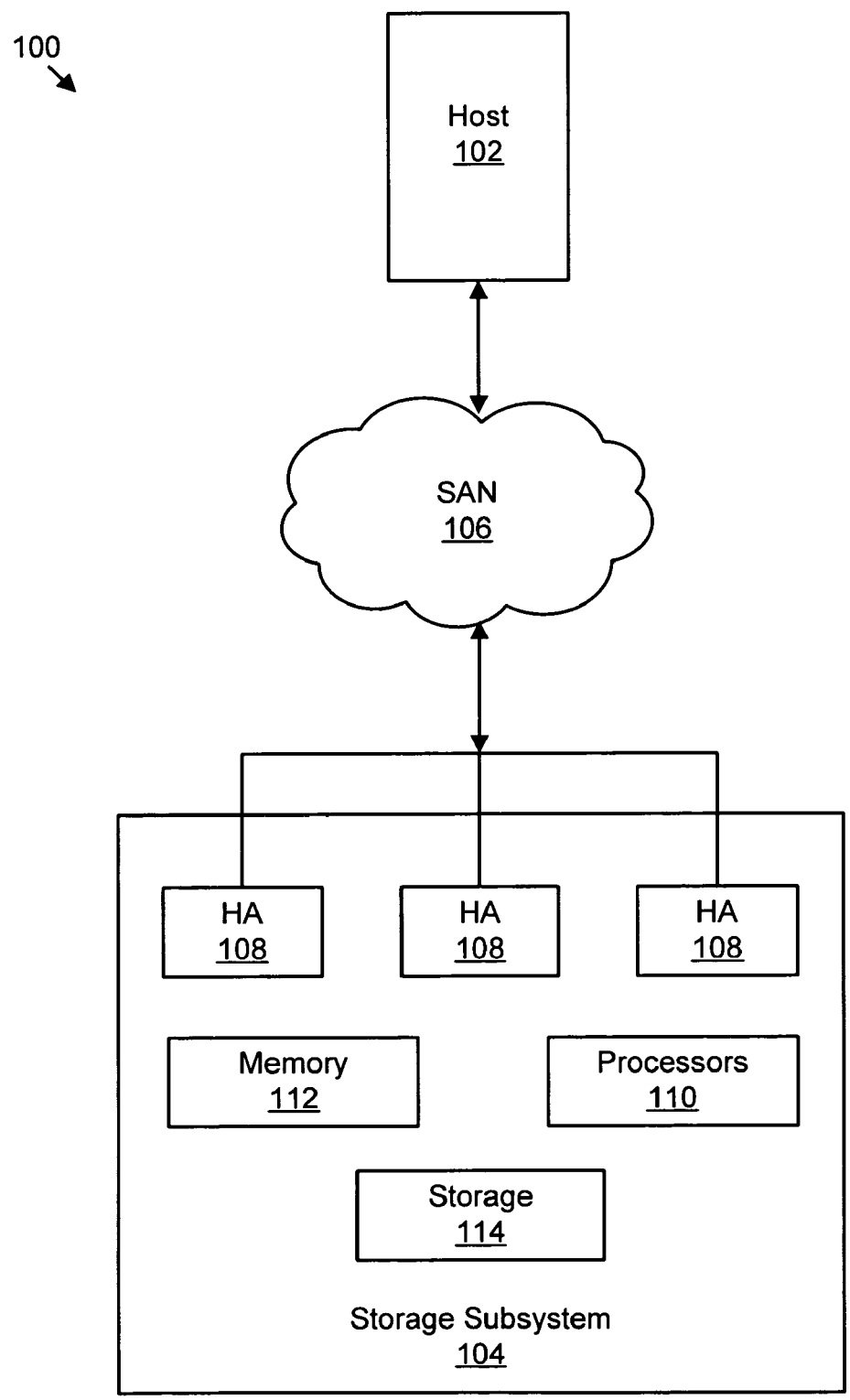
FIG. 1 is a block diagram illustrating a system of networked computers suitable for implementing the present invention.
Figure 2:
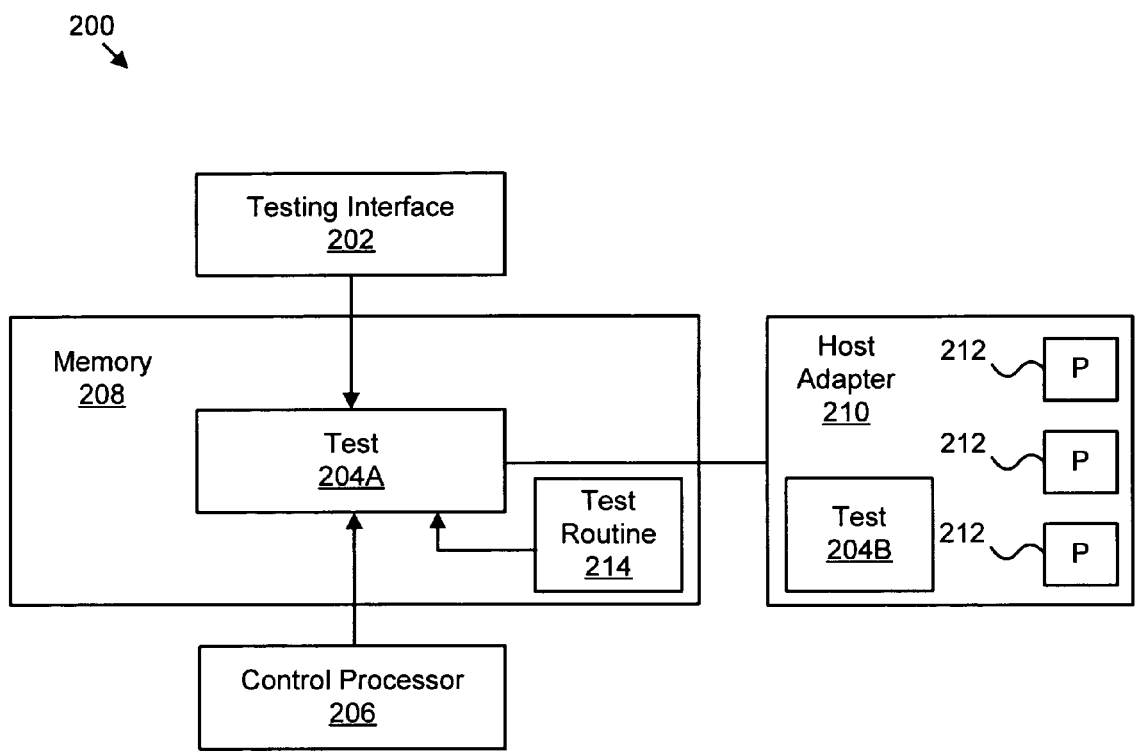
FIG. 2 is a logical block diagram illustrating one embodiment of an apparatus for facilitating port testing of a multi-port host adapter in a computer system in accordance with the present invention.

FIG. 2 illustrates a logical block diagram of a system 200 configured to facilitate port testing of a multi-port host adapter in a computer system. Various logical components of the system 200 may comprise separate or distributed hardware and/or software components within a system 100 such as that illustrated in FIG. 1.

While the present invention is described in relation to a host 102, SAN 106, and storage subsystem 104, those of skill in the art recognize that the present invention may be practiced with any networked computer system that includes a multi-port host adapter. Consequently, the scope of the present invention is not limited to the embodiments described herein. Similarly, while a specific port test routine, the wrap test, is discussed herein in detail, those of skill in the art recognize that various other port test routines may be used with the present invention. For example, a port POST (power on self test) and a port internal electrical loop back test may be used with the present invention.

The system 200 in FIG. 2 illustrates a logical representation of a system that facilitates port testing in a multi-port host adapter. The system 200 multithreads a port test routine such that multiple ports are tested in parallel. The system 200 configures the whole host adapter at once for testing of a plurality of ports and similarly reconfigures the whole host adapter once all port testing of ports completes. The system 200 takes only the ports being tested off-line and permits non-tested ports to continue to transfer I/O communications.

The system 200 includes a testing interface 202 and a test module 204. The testing interface 202 and test module 204 may be implemented using a control processor 206, an electronic memory device 208, and a host adapter 210 having at least one port 212. The testing interface 202 allows a user or an automated system such as a software module to interact with the test module 204 to initiate a port test and obtain port test results. In contrast to conventional testing interfaces however, the testing interface 202 allows a user such as a technician to initiate a port test on a plurality of ports simultaneously. The components for doing so are described in more detail below. Consequently, the user may select one port, all the ports, or a subset of the ports for parallel execution of a port test routine 214.

The test module 204 executes the port test routine 214 simultaneously on two or more ports 212 of the host adapter 210. In one embodiment, the test module 204 comprises two parts 204A, 204B of a common software module that cooperate to execute the port test routine 214 against the ports 212. Operational details of each part 204A and 204B are provided in relation to FIGS. 4 and 6. Alternatively, the test module 204 may comprise a single hardware and/or software module controlled by the control processor 206, a hardware or software module executed by the host adapter 210, or a separate hardware component in communication with the host adapter 210.

Conventionally, neither the control processor 206 nor a controller/processor (not shown) of the host adapter 210 are configured to multithread port test software. Consequently, the test module 204 includes a scheduler and multithreading module, discussed in more detail below. The scheduler and multithreading module enable the test module 204 to schedule and multithread a plurality of threads to test a plurality of ports 212 in parallel and also allow for continued I/O communications on untested ports 212.

The control processor 206 manages and controls data processing in the system 200. Typically, the control processor 206 is a microprocessor that executes an embedded single threaded operating system. In one embodiment, the control processor 206 may comprise one of the processors 110 in a storage subsystem 104 described in relation to FIG. 1. In certain embodiments, the control processor 206 is one of many processors in a Central Electronics Complex (CEC). Preferably, the test module 204A,B is configured such that the control processor 206 can initiate a port test and resume other processing tasks without waiting for the port test to complete.

The host adapter 210 communicates with one or more hosts 102 over a network such as, for example, a SAN 106. The host adapter 210 provides I/O communications between the hosts 102 and the system 200. Preferably, to provide high availability, reliability, and throughput a single host adapter 210 includes a plurality of ports 212. The host adapter 210 may be in electrical communication with the control processor 206 by a common communications bus (not shown).

Figure 3:
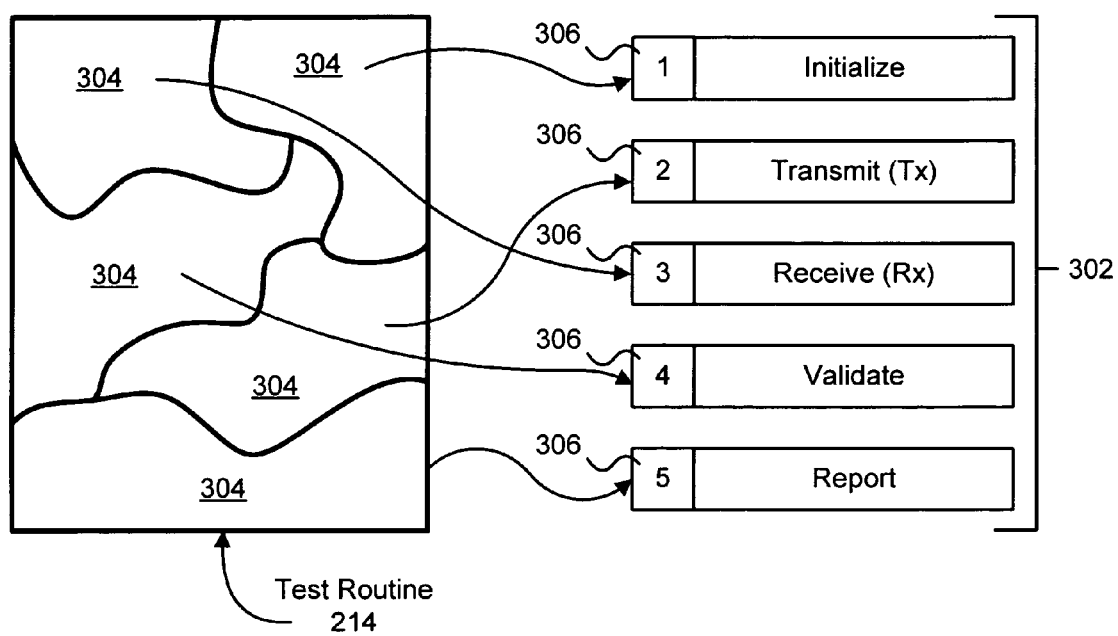
FIG. 3 is a logical block diagram illustrating dividing of a port test routine into a plurality of threads in one embodiment of the present invention.

FIG. 3 illustrates division of a port test routine 214 into a plurality of threads 302. The port test routine 214 illustrated is representative of a set of software code (source or executable). In one embodiment, conventional port test routines 214 are physically divided into smaller independently executable threads 302. References to "smaller" herein means that the thread 302 takes less time and processor resources to execute. Typically, this also means that fewer lines of executable code are in one thread 302 than in the whole port test routine 214. Also, as used herein, "threads" is intended to have its common industry meaning. Specifically, a "thread" is "a sequence of instructions executed in parallel with other sequences, either by time slicing or multiprocessing." Wikipedia on-line encyclopedia reference, under topic "thread (computer science)."

Preferably, the port test routine 214 is divided manually by engineers or other persons familiar with the dependencies and relationships among different code segments 304 of the routine 214. In certain embodiments, functionality represented by code instructions in the routine 214 is grouped such that the runtime of the resulting threads 302 is minimized.

In one embodiment, an optimal division of the routine 214 results in atomic threads 302. Atomic threads 302 are threads 302 in which the functional steps are no more than those necessary to perform a single atomic function. An atomic function is one which should complete or fail but not terminate in a state between beginning and ending. In this manner, the thread 302 takes a minimal amount of runtime/processing time and should not be interrupted. Interrupting an atomic thread 302 may require the thread 302 to be re-executed.

Alternatively, the threads 302 are configured such that as much functionality as possible is completed within an acceptable range of processing/runtime. For example, in one embodiment, the performance requirements may allow for up to five seconds for a thread 302 to execute before the thread should be switched to service other processing tasks. Consequently, the threads 302 may include a plurality of functions so long as the average execution time is below the five second threshold.

In certain embodiments, in addition to organizing functionality to minimize runtime, the functionality may also be grouped into threads 302 such that switching overhead is minimized. Switching overhead represents the time required to preserve the state of a currently executing thread 302 such that the thread 302 can be interrupted and another thread 302 allowed to use a shared processor. In certain embodiments, threads 302 are preempted based on a predefined time interval. Consequently, threads 302 that have not finished completion within the time interval are interrupted. The state information, or data, such as an identifier of the port the thread 302 is using (referred to herein as a "port context") and any status flags, are preserved so that another thread 302 can use the shared processor. Consequently, in embodiments that preempt executing threads 302, the code segments 304 are organized such that switching overhead is minimized.

FIG. 3 illustrates an example of a wrap test port routine 214 that is divided into a plurality of threads 302. The code segments 304 may be divided to minimize runtime and switching overhead. Each code segment 304 becomes a separate independently executable thread 302. Functionality of a wrap test may be organized into an initialize thread 302, a transmit thread 302, a receive thread 302, a validate thread 302, and a report thread 302.

Those of skill in the art recognize that these threads 302 are simply representative examples. Other embodiments may have more or fewer threads 302 including the same or different functionality. Furthermore, in certain embodiments, rather that dividing existing port routines 214 into threads 302, new routines 214 may be designed and organized initially for execution as threads 302. In either embodiment, the end result is a plurality of threads 302 that together perform the functions of a port test routine 214.

The initialize thread 302 may prepare the port for a wrap test by resetting buffers for example. The transmit thread 302 may transmit one or more test data packets using the port. The receive thread 302 may receive the one or more test data packets using the port. The validate thread 302 may confirm whether the one or more test data packet sent match the test data packets received. Finally, the report thread 302 may report on the success or failure of the wrap test.

Preferably, a sequence identifier 306 is associated with each thread 302. The sequence identifier 306 defines the order in which the threads 302 are to be executed using a particular port. In addition, the sequence identifier 306 may also be used to distinguish one thread 302 from the others. Alternatively, another identifier (not shown) may be associated with each thread 302. The identifier 306 may be incorporated with the thread 302 or stored in another structure. Certain threads 302 may be order independent. Consequently, certain sequence identifiers 306 may be duplicated. Using the identifier 306, the test module 204 can ensure that all threads 302 are scheduled and executed against a given port.

Figure 4:
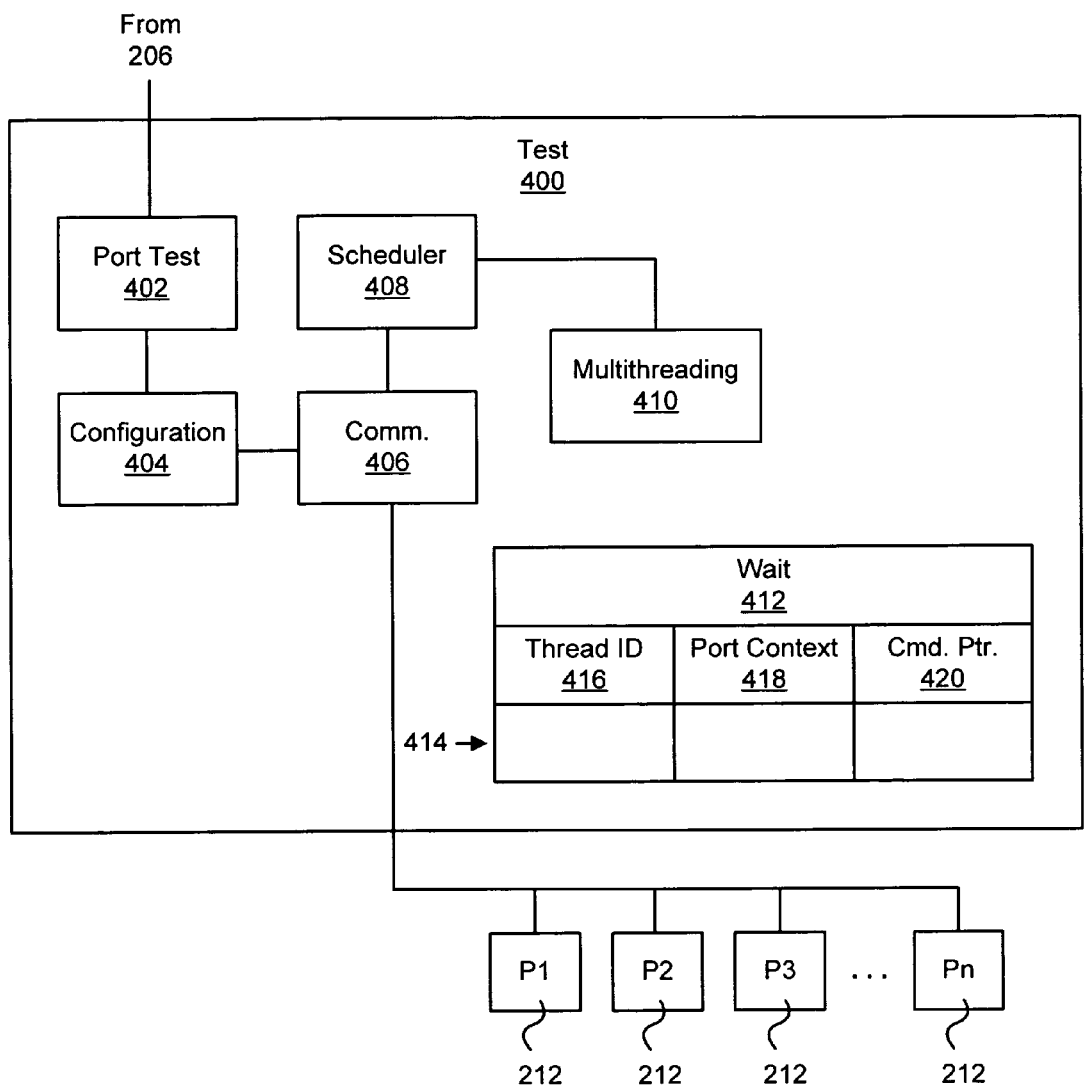
FIG. 4 is a schematic block diagram illustrating one embodiment of an apparatus for facilitating port testing of a multi-port host adapter in a computer system in accordance with the present invention.

FIG. 4 illustrates one embodiment of a test module 400 configured to facilitate port testing of a multi-port adapter such as that described in relation to FIG. 2. In one embodiment, the test module 400 corresponds to a test module 204B that may execute on the host adapter 210. The test module 400 may include a port test module 402, a configuration module 404, a communication module 406, a scheduler 408, and a multithreading module 410.

A port test module 402 receives a multi-port test request from a control processor 206. As discussed in relation to FIG. 2, the multi-port test request preferably identifies the port test and the specific ports of the adapter 210 the tests are to be run against. Conventionally, the control processor 206 maintained a communication session with a test module until the port test was completed. However, this prevented the control processor 206 from performing other useful work during the port testing period.

In certain embodiments, the port test module 402 is configured to send an acknowledgement of the multi-port test request to the control processor 206. Once the multi-port test request is acknowledged, the port test module 402 ends the communication session with the control processor 206. The control processor 206 is then free to resume normal operations servicing other tasks in the system 200.

The port test module 402 is also configured to respond to periodic status inquiries from the control processor 206. For example, the control processor 206 may send a status inquiry to the port test module 402 every five seconds. If all the port tests requested have completed, the port test module 402 may send a report message to this effect to the control processor 206. If not, the port test module 402 may send a report message indicating that port tests are still in progress. In certain embodiments, the port test module 402 may send a report message indicating the results of currently completed port tests.

The port test module 402 enables the control processor 206 to use a polling technique to determine port test results. In this manner, the control processor 206 can perform other processing tasks without waiting for the port tests to complete. Furthermore, the port test module 402 is configured to accept a single port test request that initiates a plurality of port tests for a plurality of ports 212.

The configuration module 404 communicates with the port test module 402 and configures a multi-port adapter 210 (See FIG. 2) for a port test of one or more ports in response to a single multi-port test request. Conventionally, adapters have been configured prior to each port test. The port tests of a multi-port adapter have conventionally been conducted in series. Consequently, the adapter was configured for a test and reconfigured to resume regular I/O communications according to the number of port tests requested.

In the illustrated embodiment of the present invention, the multi-port adapter 210 is configured once for port testing regardless of the number of port tests requested. The multi-port adapter 210 is reconfigured just once to resume regular I/O communications. Typically, a multi-port adapter 210 is configurable for a specific computing environment. The configuration may include transmission speeds, acceptable error or re-transmission thresholds, buffer sizes, and the like. These configuration values are stored and then reset to default values so that the port test will reliably indicate when an error is present. Adapter buffers may also be flushed in preparation for the port test.

Preferably, the configuration module 404 configures resources of the adapter 210 specific to the particular ports 212 to be tested. In addition, any shared resources on the adapter 210 may be configured for port testing such that untested ports may continue regular I/O communications.

In certain embodiments, the port test module 402 communicates to the configuration module 404 when the port tests are complete. Accordingly, the configuration module 404 reconfigures the multi-port adapter 210 to the configuration state prior to initiating the port tests. The configuration information stored earlier is read and written over the port test configuration information. Thus, the multi-port adapter 210 is configured to resume regular I/O communications. In this manner, a plurality of port tests can be conducted and the multi-port adapter 210 is configured and reconfigured just once to save time and computing resources.

The communication module 406 communicates with the configuration module 404. The communication module 406 takes individual ports 212 off-line for conducting of port tests and restores the ports 212 to on-line status once port testing is complete. As used herein, the term on-line refers to the condition in which the port 212, any port specific resources, and the controllers, such as controller 206, interfacing with the port 212 recognize that the port 212 is operational and ready to transfer regular I/O communications. Similarly, the term off-line refers to a state of the port 212, port specific resources, and the like such that the port 212 is currently unable to transfer regular I/O communications.

In one embodiment, the communication module 406 allows multiple ports 212 to be tested while one or more other ports 212 of the adapter 210 remain on-line. The communication module 406 may take a first port 212 and a second port 212 off-line and leave a third port on-line such that the third port 212 may continue to provide regular I/O communications. To leave a third port on-line, the communications module 406 may preserve certain queues, buffers, I/O channels, and other resources on the adapter 210.

Those of skill in the art recognize that taking a port 212 off-line may be implemented in a variety of ways. For example, a status flag for the port 212 may be toggled off, a port 212 may be removed from a pool or queue of available ports 212 identified by the controller 206, and a variety of other ways to indicate whether a port 212 can be used for I/O communications may be implemented. By taking one or more ports 212 off-line and leaving one or more ports 212 on-line, the adapter 210 can continue I/O operations during port testing. In this manner, port testing has less of an impact on regular I/O communications.

In certain embodiments, the port test request is communicated to the scheduler 408. The scheduler 408 schedules execution of a plurality of threads 302 to test a first port 212 and a second port 212 of a multi-port adapter 210. The scheduler 408 associates a port 212 with the appropriately ordered threads 302 for performing the requested port test. Initially, the scheduler 408 identifies the threads 302 for the requested port test. In certain embodiments, the scheduler 408 orders the threads 302 according to an order suitable for conducting the port test. Alternatively, the scheduler 408 may sort the threads by each thread sequence identifier 306.

As described in relation to FIG. 3, the threads 302 comprise independent executable segments of a single port test routine 214. Each thread 302 is designed to be executed for a fixed period of time or to be interrupted as needed such that multithreading can be performed. Consequently, the threads 302 are associated with a port context. The port context is stored when a thread 302 stops executing and re-read when the thread 302 or a related next thread 302 resumes/begins execution.

A port context represents substantially all the information relating to the specific port 212 against which the port test is being run. Some examples of this information may include a port identifier, a port address for a communication bus, addresses of port specific buffers and flags, and the like. In one embodiment, the scheduler 408 combines port context with the threads 302. Alternatively, the port context is stored in a data structure in memory 208 such as a record. The port context may be referenced as needed by the threads 302.

The scheduler 408 associates the threads 302 with the port context. In one embodiment, the threads 302 include an indicator of a memory address where the port context is stored. In another embodiment, the port context is stored in a data structure representing the thread 302.

With the threads 302 identified, ordered, and associated with the appropriate ports 212 via the port context, the scheduler 408 then organizes the threads 302 for execution. In one embodiment, a wait queue 412 is populated by the scheduler 408. The wait queue 412 includes a set of entries 414 specific to a particular port test and port 212. Entries are made in the wait queue 412 such that by executing threads 302 from the beginning of the queue 412 the proper order of operation for the threads 302 of each specific port test is achieved. In one embodiment, the wait queue 412 holds entries 412 for all threads 302 of all the port tests for multiple ports 212.

Preferably, the port context is stored in memory 208 and the threads 302 comprise a common set of machine executable code also stored in memory 208. Consequently, the wait queue 412 holds a set of pointers for each entry 414. The first pointer is a thread ID 416 which uniquely identifies the thread 302 to be executed. The port context pointer 418 indicates the address where the port context is stored. The command pointer 420 may comprise an address for executable code that implements the thread 302.

Preferably, the scheduler 408 generates an entry 414 for each thread 302 needed to implement a requested port test routine 214 against a particular port 212. The scheduler 408 ensures that each thread 302 is executed for each port 212 tested. For example, if two ports 212 are tested, a port initialization thread 302 will be executed twice, once for each port 212. Consequently, an entry 414 for each port initialization thread 302 is entered.

In one embodiment, the scheduler 408 organizes the entries 414 such that entries 414 for a first port test of a first port 212 are about evenly distributed with entries 414 for a second port test of a second port 212. In this manner, the order of entries 414 in the wait queue 412 evenly divides execution time between a plurality of port tests, the threads 302 of each port test still being executed in proper order.

The processes of substantially distributing the execution order/time between two or more port test threads 302 is referred to herein as multithreading. In particular, the term multithreading as used herein is intended to have its industry accepted meaning. Specifically, multithreading means sharing of a single processor between multiple threads such that time required to switch which thread is being executed by the processor is minimized. See definition of multithreading in the Free Online Dictionary of Computing www.foldoc.org. By multithreading the execution order, the two or more port test threads can be conducted in parallel. Multithreading means that one port test does not wait for a preceding port test before beginning execution. Instead threads of both port tests are conducted concurrently.

In this manner, the scheduler 408 schedules multi-port test requests such that the port test of a first port and a second port will be conducted in parallel once execution begins. The multithreading module 410 implements the multithreading of the scheduled threads 302 as indicated by the wait queue 412 and maintains multithreading as threads 302 continue to execute. In addition, the multithreading module 410 multithreads other threads. For example, threads from earlier port test requests or from different port tests may be multithreaded by the multithreading module 410. In one embodiment, the multithreading module 410 multithreads port test threads 302 and I/O communications on non-tested ports such that the I/O communications and the port test threads 302 execute concurrently.

Figure 5:
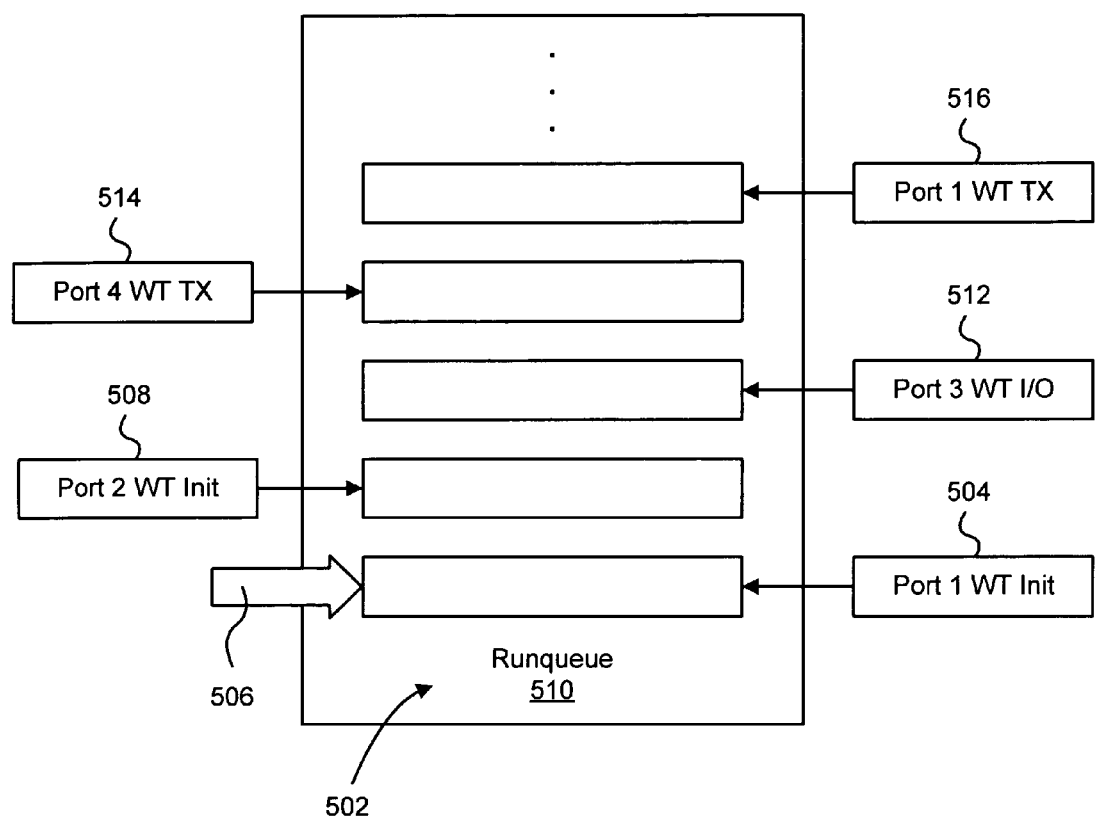
FIG. 5 is a logical block diagram illustrating how threads may be multithreaded in accordance with the present invention.

Referring now to FIGS. 4 and 5, the operation of the multithreading module 410 is explained in more detail. The multithreading module 410 manages execution of threads 302 for port tests as well as threads for other computing tasks such as I/O communications on a multi-port adapter 210, referred to collectively as threads 502. In one embodiment, the multithreading module 410 executes a first thread 504 on a processor (not shown) of the multi-port host adapter 210. The multithreading module 410 may swap the first thread 504 (indicated by arrow 506) with a next thread 508. This means that the first thread 504 is placed in a wait or hold state and the next thread 508 executes on the shared processor. In certain embodiments, entries 414 indicating the next thread 508 are taken from a run queue 510.

In one embodiment, the multithreading module 410 determines when to swap threads 502. The multithreading module 410 may include a timer such that the multithreading module 410 switches threads 502 after a predetermined time interval (time slicing, preemptive multithreading). The timer may be reset to a predetermined value, for example one second, each time a thread 502 is swapped. Alternatively, the thread 502 may indicate the time interval. If the time interval is indicated, threads 502 that require more time before being interrupted are not interrupted prematurely.

Alternatively, in certain embodiments the multithreading module 410 may not preempt threads 502. Instead, the threads 502 may include commands that signal the multithreading module 410 to make a swap. For example, a yield or idle command may be issued indicating that the thread 502 can now be swapped so that processor cycles are not wasted.

Once the multithreading module 410 determines that a thread 502 is to be swapped, the multithreading module 410 stores the port context for a thread 504 associated with a port test routine. The port context may also include state information related to the port test. For example, a status flag indicating that initialization is complete may be stored in the port context. In one embodiment, the port context is stored in non-volatile storage. Next, the multithreading module 410 reads the port context for the next thread 508 and begins execution of the next thread 508 (arrow 506 moves to point at thread 508). The port context may include static information as described above or dynamic information updated by previously executed threads 302 for a particular port test.

In one embodiment, the run queue 510 has a fixed number of entries. As threads 502 complete, the scheduler 408 may add threads 502 from the wait queue 412. In addition, other schedulers such as an I/O communications scheduler (not shown) may add I/O communication threads. New threads may be added to the front of the queue 510. In this manner, the multithreading module 410 permits multithreading of port test threads 302 and other non-port test threads such as I/O communications.

The multithreading module 410 may cycle through each of the threads 502 checking the status of each thread 502. In one embodiment, the status is either "READY" or "BLOCKED." If the status is "READY," the thread 502 is swapped and execution resumes/begins on the thread 502. If the status is "BLOCKED," the multithreading module 410 moves on to the next thread 502 in the queue 510. Typically, a thread 502 is blocked while waiting for another system component. Once the hardware component completes the blocked task, the thread status returns to "READY." If the wait is longer than a few seconds, the thread 502 blocks such that other threads 502 can use the processor.

FIG. 5 illustrates that multiple ports are being tested substantially simultaneously. In the example, suppose a multi-port test request indicates that a wrap test ("WT") port test is to be performed on ports 1, 2. Further suppose that a WT was initiated earlier on port 4 and that port 3 is not being tested. Port 3 is providing I/O communications.

The run queue 510 illustrates parallel execution of threads 502 for ports 1-4. Thread 504 is a wrap test initialization thread for port 1 and is currently being executed 506. Thread 508 is a wrap test initialization thread for port 2. Suppose the time interval is one second. Consequently, thread 508 is executed very quickly after thread 504 begins execution. Threads 504 and 508 are executed essentially in parallel. Thread 508 may not wait for thread 504 to complete before beginning execution.

The next thread 502 in the run queue 510 may be an I/O communication thread 512 using port 3. The I/O communication thread 512 may transfer some portion of I/O data to resume regular I/O operations. As a wrap test for port 4 was initiated earlier, the next thread 502 may be a transmit test data thread 514 for port 4. Supposing the initialization thread 504 for port 1 completes, the next thread may be a transmit test data thread 516 for port 1.

In this manner, port test routines for ports 1, 2, and 4 are being executed concurrently with I/O communications over port 3. Preferably, multithreading module 410 uses the run queue 510 for all commands executed by the processor of the host adapter 210. Consequently, the present invention permits port test threads 302 to be interleaved/multithreaded with other I/O communications operations. In addition, the present invention takes individual ports off-line as needed for port tests. Furthermore, the present invention multithreads/interleaves the threads 502. The present invention includes dividing port test routines 214 into independently executable threads 502.

In certain embodiments, the processor (not shown) of the multi-port host adapter 210 executes a non-multithreaded operating system (OS). Consequently, the multithreading module 410 provides multithreading of threads where the OS has no such support. Those of skill in the art recognize however, that certain embodiments of the multithreading module 410 may cooperate with a multithreaded OS such that common tasks described above are not duplicated. The present invention may be implemented with or without a multithreaded operating system for the processor of the multi-port host adapter 210.

Figure 6:
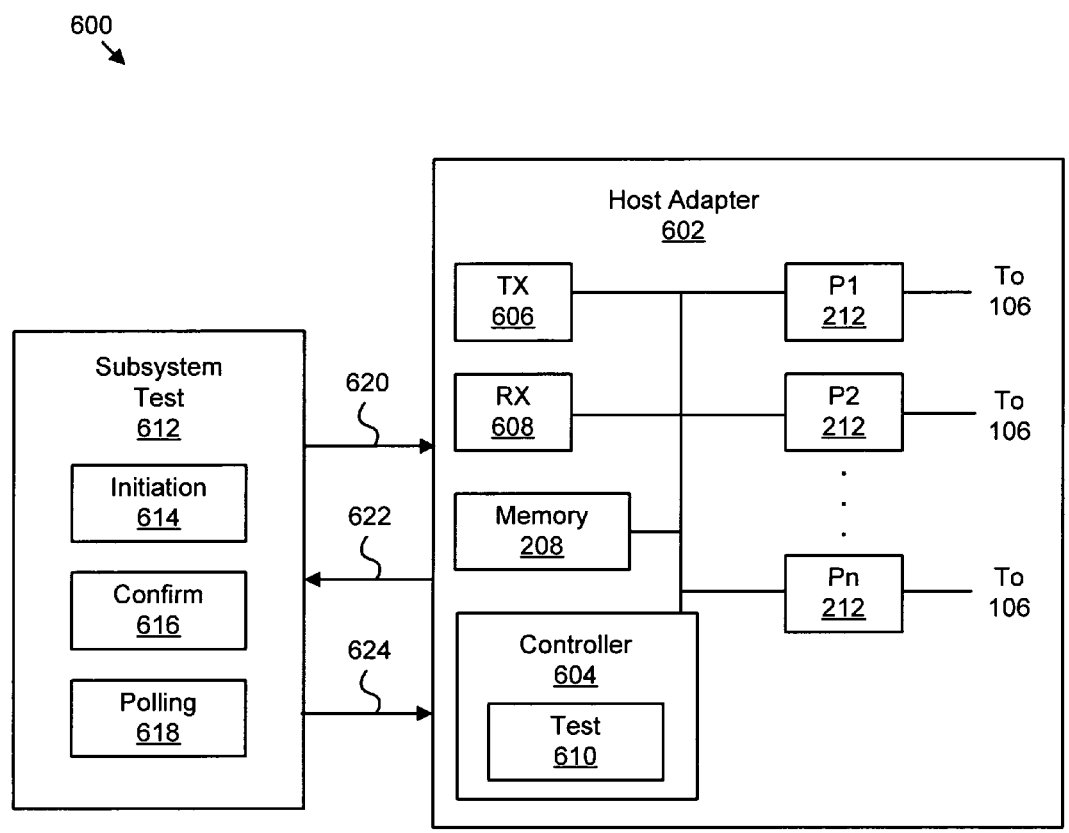
FIG. 6 is a schematic block diagram illustrating an alternative embodiment of an apparatus for facilitating port testing of a multi-port host adapter in a computer system in accordance with the present invention.

FIG. 6 illustrates one embodiment of an apparatus 600 for facilitating port testing of a multi-port host adapter. The apparatus 600 includes a host adapter 602. The host adapter 602 includes substantially the same functionality and hardware as described in the host adapter 210 in relation to FIG. 2. In addition, the adapter 602 includes a controller 604, a transmitter 606, and a receiver 608.

The controller 604 may include a central processing unit configured to execute microcode stored in memory 208 to manage operation of the adapter 602. The transmitter 606 transmits data packets via the ports 212 to the hosts 106. The receiver 608 receives data packets via the ports 212 from the hosts 106. Of course, in certain embodiments, each port 212 may include a separate transmitter 606 and receiver 608. In one embodiment, the transmitter 606 and the receiver 608 respectively, convert electrical signals to light signals and vice versa.

The controller 604 further includes a test module 610 substantially similar in functionality to the test module 400 described in relation to the FIG. 4. The test module 610 interfaces with a corresponding subsystem test module 612 that may reside in a host or subsystem for the host adapter 602, such as a storage subsystem 104 (See FIG. 1).

The subsystem test module 612 includes an initiation module 614, a confirmation module 616, and a polling module 618. The subsystem test module 612 may be implemented as software, hardware, or a combination of both. Preferably, the subsystem test module 612 operates under the control of one or more processors of a host or subsystem.

The initiation module 614 sends a multi-port test request 620 to the controller 604. The multi-port test request 620 identifies one or more ports 212 on the adapter 602 that a port test routine 214 (See FIG. 2) is to be executed against. Preferably, including a plurality of ports 212 in the multi-port test request 620 reflects a desire to test the multiple ports 212 in parallel. If it is desired to test multiple ports 212 in series, each port 212 may be referenced in a separate multi-port test request 620.

Typically, the multi-port test request 620 is a message passed along a communications bus connecting the subsystem test module 612 and the controller 604. The controller 604 interprets the message 620 and passes the message 620 to the test module 610. The test module 610, as described above in relation to the test module 400 (See FIG. 4), uses a scheduler 408 and multithreading module 410 to multithread port test threads 302 to test a plurality of ports 212 in parallel.

In certain embodiments, the multi-port test request 620 does not include certain ports 212 indicating that those ports 212 are to continue servicing I/O tasks. Consequently, the controller 604 takes the ports 212 included in the multi-port test request 620 off-line and leaves the untested ports 212 on-line. The controller 604 then multithreads I/O tasks for these ports 212 with port test threads 302 for the tested ports 212.

In response to the multi-port test request 620, the controller 604 sends an acknowledgement 622. In one embodiment, the port test module 402 sends the acknowledgement 622. The acknowledgement 622 is received by the confirmation module 616 and communicated to the polling module 618.

The polling module 618 ends the communication session with the controller 604. This allows a control processor 206 (See FIG. 2) that originally initiated the multi-port test request to resume normal operations. In addition, the controller 604 periodically sends status inquiries 624 to the controller 604. The status inquiries 624 may be sent every few seconds, few minutes, or the like. In response to status inquiries 624, the test module 610 sends a report message. The report message may indicate whether any port tests have completed and if so what the result was (i.e., PASS or FAIL). Report messages of incomplete tests may be processed by the polling module 618. If one or more port tests are complete, the polling module 618 may communicate this information to a user interface and/or an output device.

Figure 7:
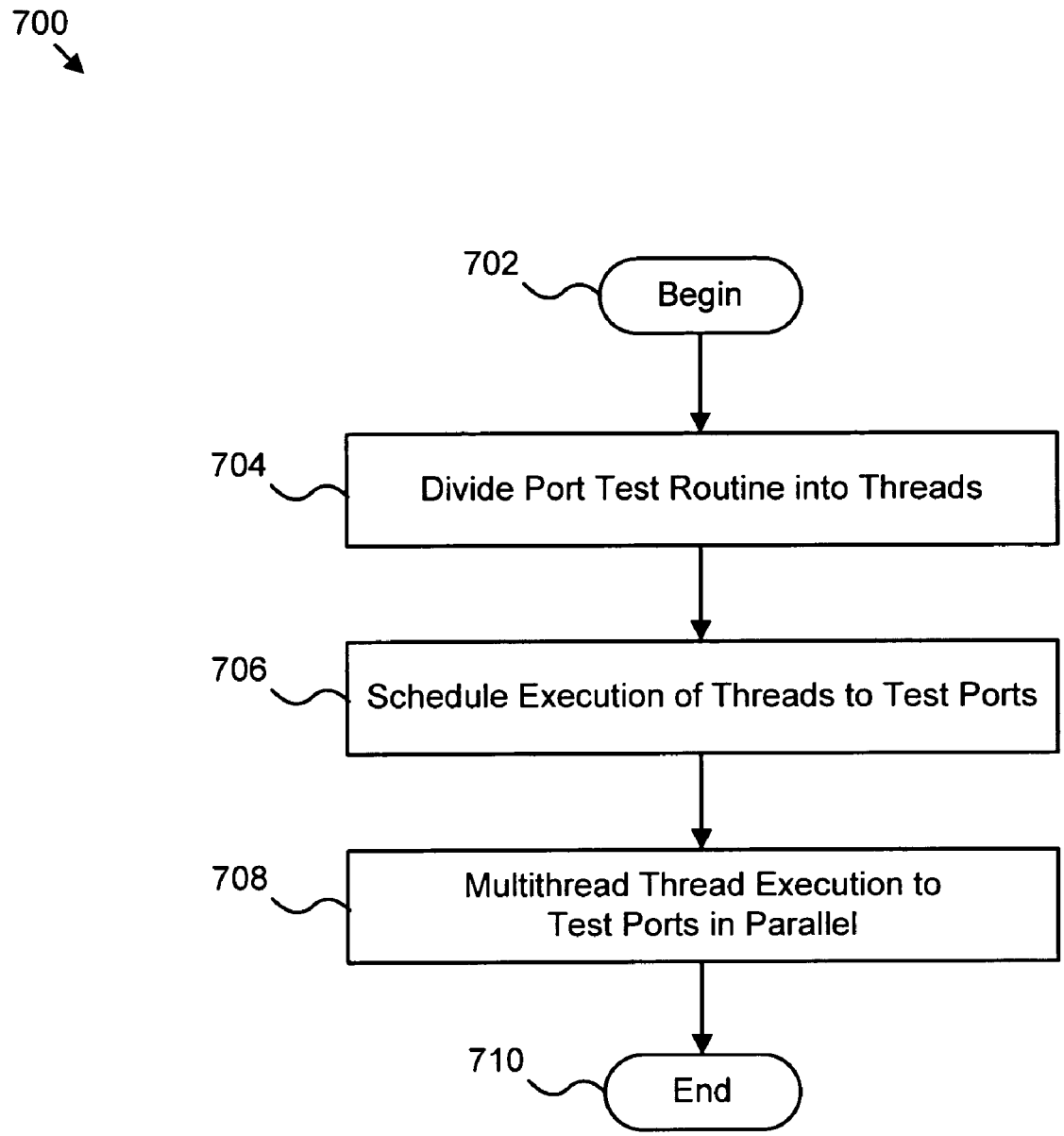
FIG. 7 is a schematic flow chart diagram illustrating a method for facilitating port testing of a multi-port host adapter in a computer system.

FIG. 7 illustrates a flow chart of a method 700 for facilitating port testing of a multi-port host adapter. Referring now to FIGS. 2, 4, and 7, the method 700 begins 702 once port test routines 214 are written or revised to accommodate a multi-port host adapter 210. First, the port test routine 214 is divided 704 into a plurality of threads 302. Each thread 302 comprises a complete segment of the test routine 214. Preferably, the threads 302 are independently executable and have minimal dependence on a particular sequence of thread 302 execution. In addition, the threads 302 are designed such that execution time and switching overhead is minimized. The threads 302 may be stored with other microcode of a host adapter 210.

Next, a subsystem or other control processor 206 may initiate multi-port test requests such as a wrap test. Typically, this is part of a troubleshooting exercise performed by a technician for the subsystem. In response to the multi-port test request, the test module 204A, 204B schedules 706 execution of the plurality of threads 302 for the particular port test and for a particular port. Where multiple ports 212 are included in the multi-port test request a scheduler 408 of the test module 204A, 204B schedules the threads 302 for the testing of each port 212 such that the threads 302 are interleaved. In other words, time spent executing threads 302 that test a first port 212 is about evenly split with time spent executing threads 302 that test a second port 212.

Finally, execution of the threads 302 is multithreaded 708 such that a port test for a first port 212 and a second port 212 are performed in parallel. In one embodiment, a multithreading module 410 preemptively switches threads 302 between using a shared processor and a wait condition (time slicing). In other embodiments, the multithreading module 410 responds to signals from the threads 302 indicating that a switch can not occur (non-preemptive). The multithreading module 410 may work independently of, or in conjunction with, a multi-threaded embedded operating system of the host adapter 210. In addition, the multithreading module 410 multithreads the port test threads 302 with I/O tasks on ports that are not being tested.

Figure 8:
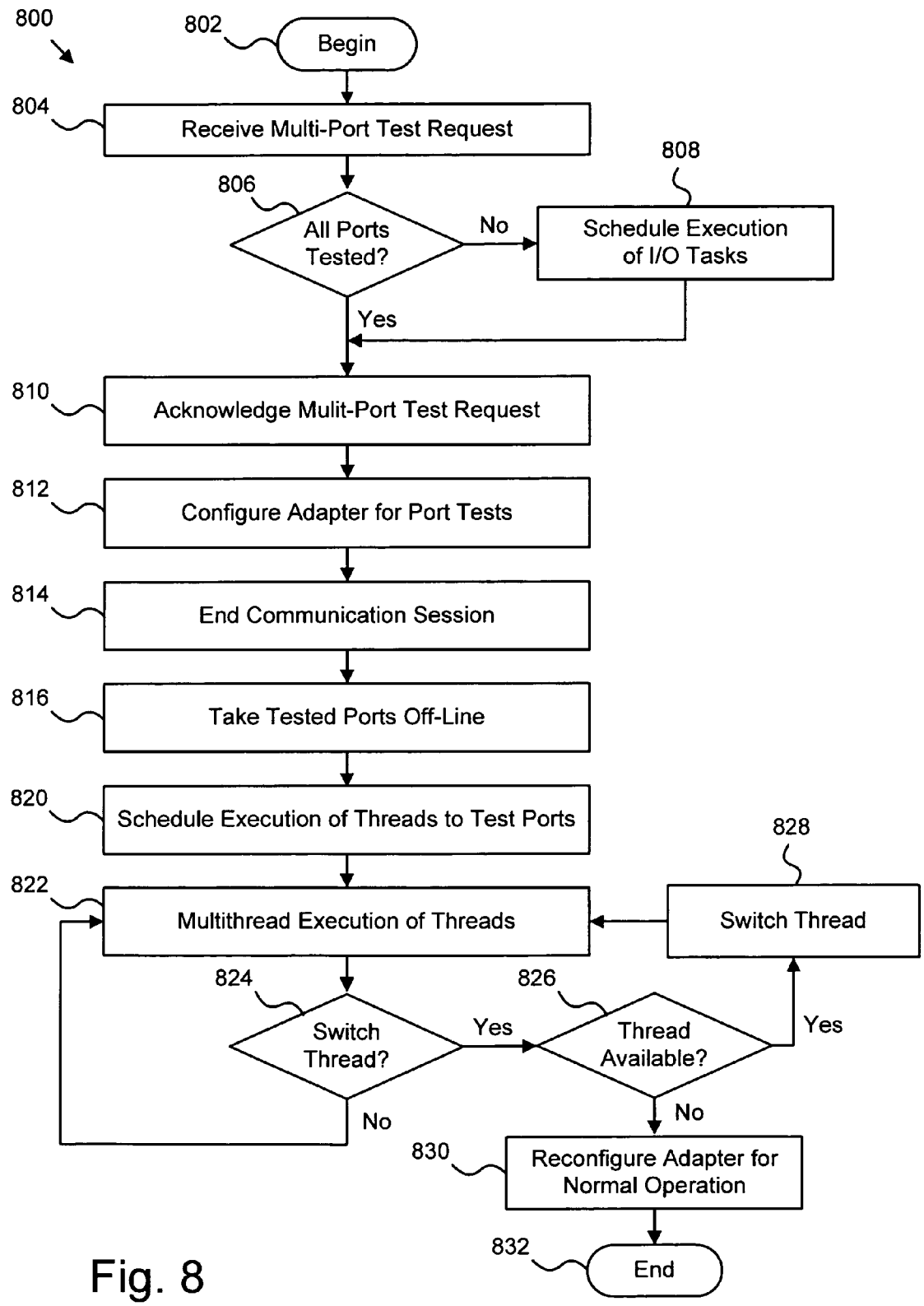
FIG. 8 is a schematic flow chart diagram illustrating a more detailed method for facilitating port testing of a multi-port host adapter in a computer system.

FIG. 8 illustrates a flow chart of a method 800 for facilitating port testing of a multi-port host adapter. The method 800 begins 802 by receiving 804 a multi-port test request 620 (See FIG. 6). Next, a determination 806 may be made whether all available ports 212 of the host adapter 210 are being tested in a multi-port port test. The test module 204A, 204B may compare the ports listed in the multi-port test request 620 with the ports 212 of the host adapter 210. If not all the ports are being tested, the test module 204A, 204B schedules 808 execution of I/O tasks in parallel with execution of port test threads 302.

Next, if all the ports 212 are being tested or I/O tasks have been setup to be included in the multithreading of port threads 302, the test module 204A, 204B acknowledges 810 the multi-port test request 620. This allows the subsystem or other controller that initiates the multi-port test request 620 to resume normal operations. Next, in one embodiment, the test module 204A, 204B configures 812 the host adapter 210 for port testing. As explained above, this may include preserving the state of ports currently in use. Preferably, the configuration step 812 is performed once for a plurality of port tests such that overall port testing requires less time.

Then, the test module 204A, 204B ends 814 a communication session with the control processor 206 (and potentially the application utilizing the control processor 206). The control processor 206 is then free to perform other operations besides port testing. The test module 204A, 204B takes 816 each port 212 that is involved in a port test off-line. Ports not being tested are left on-line to continue handling I/O tasks.

Next, the test module 204A, 204B schedules 820 execution of thread 302 for testing the ports 212. In one embodiment, a scheduler 408 schedules the threads 302 such that testing of a first port 212 is completed concurrent with testing of a second port 212. If not all ports 212 are being tested 806 and I/O tasks are queued, the scheduler 408 may interleave the I/O tasks with port test tasks 302 such that port testing and I/O tasks are performed in parallel.

A multithreading module 410 multithreads 822 execution of the scheduled thread and any new threads added as processing is being done. As indicated above, the multithreading may be preemptive (time slicing) or non-preemptive. The multithreading module 410 determines 824 if time has passed or another condition has been met such that the currently executing thread should be switched. If so, the multithreading module 410 determines 826 if another thread is available for execution. If so, the multithreading module 410 switches 828 the executing thread with the thread available for execution and multithreaded execution 822 of threads continues. Likewise, if sufficient time for a thread switch or a switch condition has not been satisfied, the multithreading module 410 continues multithreaded execution 822.

If a switch condition is met and no more threads are available, the test module 204A, 204B reconfigures the host adapter 210 to normal operation. In other words, all buffers and configuration settings of the memory 208 and the ports that were tested is restored to the state prior to conducting the multi-port port tests. Finally, the method 800 ends 832.

Those of skill in the art will quickly recognize the benefits provided by the present invention. The ability conduct ports tests concurrently provides a significant time savings over performing multiple port tests in series. Furthermore, the ability for a control processor to begin multiple port tests and then resume normal operations while the tests conducted provides additional time saving efficiencies. In addition, by keeping non-tested ports on-line and available for I/O tasks multi-port host adapters provide more I/O throughput than if the whole adapter were taken off-line to conduct port testing. Finally, configuring and reconfiguring a host adapter once for a plurality of port tests saves additional processing time. Saving time can add significant benefits in systems and subsystems utilizing host adapters within the scope of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing the description. All changes which come within the meaning and range of equivalency of the claims are to be embraced within their scope.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

What is claimed is:

1. An apparatus for facilitating port testing of a multi-port host adapter, the apparatus comprising:
   a scheduler configured to schedule execution of a plurality of threads to test a first port and a second port of the multi-port host adapter, the threads comprising independent executable segments of a port test routine, the test represented by the port test routine; and
   a multithreading module configured to provide multi-threaded execution of the plurality of threads such that the port test of the first port and the port test of the second port are performed in parallel.

2. The apparatus of claim 1, further comprising a communication module configured to take the first port and the second port off-line while a third port of the multi-port host adapter remains on-line to provide Input/Output (I/O) communications and wherein the multithreading module is further configured to multithread I/O communications and the plurality of threads involving the first port and the second port, the I/O communications utilizing the third port.

3. The apparatus of claim 1, further comprising a configuration module configured to configure the multi-port host adapter for a port test of the first port and the second port in response to a single multi-port test request.

4. The apparatus of claim 3, wherein the configuration module is further configured to reconfigure the multi-port host adapter to resume regular I/O communications in response to completion of the port test routine on the first port and the second port.

5. The apparatus of claim 3, further comprising
a port test module configured to acknowledge the multi-port test request from a control processor, to end a communication session with the control processor such that the control processor can resume normal operations, and to send status report messages to the control processor in response to periodic status inquiries from the control processor.

6. The apparatus of claim 1, wherein the threads comprise related functionality of the test routine grouped such that runtime and switching overhead for each thread is minimized.

7. The apparatus of claim 1, wherein the scheduler orders execution of the plurality of threads such that each thread is executed with each port tested.

8. The apparatus of claim 1, wherein the multithreading module stores a port context for each of the first port and the second port and reads the port context in response to resuming execution of the thread associated with each port.

9. The apparatus of claim 1, wherein the multithreading module executes each thread for a predetermined time interval.

10. An apparatus for facilitating port testing of a multi-port host adapter, the apparatus comprising:
an initiation module configured to send a multi-port test request to a controller of the multi-port host adapter, the multi-port test request identifying one or more ports of the multi-port host adapter for a port test routine, the controller comprising
a scheduler configured to schedule execution of a plurality of threads to implement the port test routine, the threads comprising independent executable segments and
a multithreading module configured to provide multithreaded execution of the plurality of threads such that the port test of one port and the port test of any additional ports of the multi-port host adapter are performed in parallel;
a confirmation module configured to receive an acknowledgment from a port test module of the controller, the port test module configured to acknowledge the multi-port test request;
a polling module configured to end a communication session with the controller, to send periodic status inquiries, and to process status report messages from the controller.

11. The apparatus of claim 10, wherein the controller is further configured to take at least one of the ports off-line while other ports remain on-line to provide I/O communications, the controller multithreading I/O communications and the plurality of threads.

12. A system for facilitating port testing of a multi-port host adapter, comprising:
a control processor configured to manage and control data processing in the system;
a host adapter configured to communicate with a host over a network, the host adapter comprising a plurality of ports;
a test module configured to execute a port test routine simultaneously on two or more ports of the host adapter, the test module comprising a scheduler configured to schedule execution of a plurality of threads to test at least two ports of the host adapter, the threads comprising independent executable segments of a port test routine, and
a multithreading module configured to provide multithreaded execution of the plurality of threads such that the port test of the at least two ports an I/O processing continuing on any untested ports are performed in parallel; and
a testing interface configured to communicate with the test module to initiate port tests and report results of port tests.

13. The system of claim 12, wherein the test module further comprises
a communication module configured to take a first port and a second port off-line while a third port of the host adapter remains on-line to provide I/O communications; and
wherein the multithreading module is further configured to multithread I/O communications and the plurality of threads involving the first port and the second port, the I/O communications utilizing the third port.

14. The system of claim 13, wherein the test module further comprises a configuration module configured to configure the host adapter for a port test of the first port and the second port in response to a single multi-port test request.

15. The system of claim 14, wherein the configuration module is further configured to reconfigure the host adapter to resume regular I/O communications in response to completion of the port test routine on the first port and the second port.

16. The system of claim 14, further comprising
a port test module configured to acknowledge a multi-port test request, to end a communication session initiated by the multi-port test request, and to send status report messages in response to periodic status inquiries.

17. The system of claim 16, wherein the threads comprise related functionality of the test routine grouped such that runtime and switching overhead for each thread is minimized.

18. The system of claim 17, wherein the multithreading module stores a port context for each of the first port and the second port and reads the port context in response to resuming execution of the thread associated with each port.

19. The system of claim 18, wherein the multithreading module executes each thread for a predetermined time interval before switching to another thread or I/O task.

20. A computer program product comprising a computer readable storage medium having computer readable program code executable to perform operations to facilitate port testing of a multi-port host adapter, the operations comprising:
dividing a port test routine into a plurality of threads, each thread comprising a segment of the routine;
scheduling execution of the plurality of threads to test a first port and a second port of the multi-port host adapter, the test represented by the port test routine; and
multithreading execution of the plurality of threads such that the port test of the first port and the port test of the second port are performed in parallel.

21. The computer program product of claim 20, the operations further comprising
taking the first port and the second port off line while a third port of the multi-port host adapter remains on-line to provide I/O communications;
multithreading I/O communications and the plurality of threads involving the first port and the second port, the I/O communications utilizing the third port.

22. The computer program product of claim 20, the operations further comprising
configuring the multi-port host adapter for a port test of the first port and the second port in response to a single multi-port test request.

23. The computer program product of claim 22, the operations further comprising
reconfiguring the multi-port host adapter to resume regular I/O communications in response to completion of the port test routine on the first port and the second port.

24. The computer program product of claim 22, the operations further comprising
acknowledging the multi-port test request from a control processor;
ending a communication session with the control processor such that the control processor can resume normal operations; and
sending status report messages to the control processor in response to periodic status inquiries from the control processor.

25. The computer program product of claim 20, wherein dividing a port test routine further comprises grouping related functionality of the test routine into a thread such that runtime of each thread is minimized.

26. The computer program product of claim 20, wherein scheduling execution of the plurality of threads further comprises ordering execution of the plurality of threads such that each thread is executed with each port tested.

27. The computer program product of claim 20, wherein multithreading execution of the plurality of threads further comprises storing a port context for each of the first port and the second port and reading the port context in response to resuming execution of the thread associated with each port.

28. The computer program product of claim 20, wherein multithreading execution of the plurality of threads further comprises executing each thread for a predetermined time interval before switching threads.

29. A method for facilitating port testing of a multi-port host adapter, the method comprising:
dividing a port test routine into a plurality of threads, each thread comprising a segment of the routine;
scheduling execution of the plurality of threads to test a first port and a second port of the multi-port host adapter, the test represented by the port test routine; and
multithreading execution of the plurality of threads such that the port test of the first port and the port test of the second port are performed in parallel.

30. An apparatus for facilitating port testing of a multi-port host adapter, the apparatus comprising:
a means for dividing a port test routine into a plurality of threads, each thread comprising a segment of the routine;
a means for scheduling execution of the plurality of threads to test a first port and a second port of the multi-port host adapter, the test represented by the port test routine; and
a means for multithreading execution of the plurality of threads such that the port test of the first port and the port test of the second port are performed in parallel.

* * * * *